United States Patent [19]
Watson

[11] 3,782,223
[45] Jan. 1, 1974

[54] POWER TRANSMISSION SYSTEMS
[75] Inventor: Kenneth Watson, Yeovil, England
[73] Assignee: Westland Aircraft Limited, Yeovil, Somerset, England
[22] Filed: May 15, 1972
[21] Appl. No.: 253,239

[30] Foreign Application Priority Data
June 1, 1971    Great Britain................... 18,361/71

[52] U.S. Cl............... 74/665 L, 74/661, 74/665 Q, 416/170
[51] Int. Cl............................................ F16h 37/06
[58] Field of Search..................... 74/665 L, 665 M, 74/665 N, 665 Q, 665 P, 661; 416/170

[56] References Cited
UNITED STATES PATENTS

| | | |
|---|---|---|
| 2,380,889 | 7/1945 | Waseige........................ 416/170 X |
| 2,979,968 | 4/1961 | Beurer............................... 416/170 |
| 3,220,283 | 11/1965 | Ricard................................. 74/661 |
| 3,362,255 | 1/1968 | DeRocca et al.................. 74/665 L |
| 3,455,182 | 7/1969 | Kelley................................. 74/661 |
| 3,255,825 | 6/1966 | Mouille et al................. 74/665 L X |

Primary Examiner—Leonard H. Gerin
Assistant Examiner—J. Reep
Attorney—Roberts B. Larson et al.

[57] ABSTRACT

A power transmission system for a twin engine helicopter includes drive shafts and gearing connecting the engines to a rotor drive shaft and two gear trains, each gear train being arranged to drive a set of helicopter accessories. The transmission is arranged so that at least one of the gear trains remains operational through a wide range of failure conditions in both the engines and the transmission system.

5 Claims, 2 Drawing Figures

POWER TRANSMISSION SYSTEMS

This invention relates to power transmission systems, and more particularly to a power transmission system for a helicopter.

Twin engine helicopters are known which are capable of operation on one engine to provide at least a "return to base" facility. A further safety factor unique to the helicopter is its ability to descend and land safely after a complete power source failure using a technique known in the art as "autorotation." During this type of operation it is vital that the helicopter controls are operative, and it is, therefore, imperative that at least the essential services such as hydraulic power supplies are maintained. Such services have previously been supplied either by the provision of a separate power source which incurs a severe weight penalty, or by a gear train operating a single set of accessories so that a failure in the gear train renders all accessories non-operational.

According to the invention I provide a power transmission system for a helicopter having two engines, the engines being connected by drive shafts and gearing to a rotor drive shaft and two gear trains, each gear train being arranged to drive a set of helicopter accessories, the transmission being arranged so that at least one of the gear trains can be driven by at least one of the engines independent of the rotor drive shaft, by either or both of the engines in combination with the rotor drive shaft, or by the rotor drive shaft.

The invention will now be described by way of example only and with reference to the accompanying drawings, in which.

Figure 1:
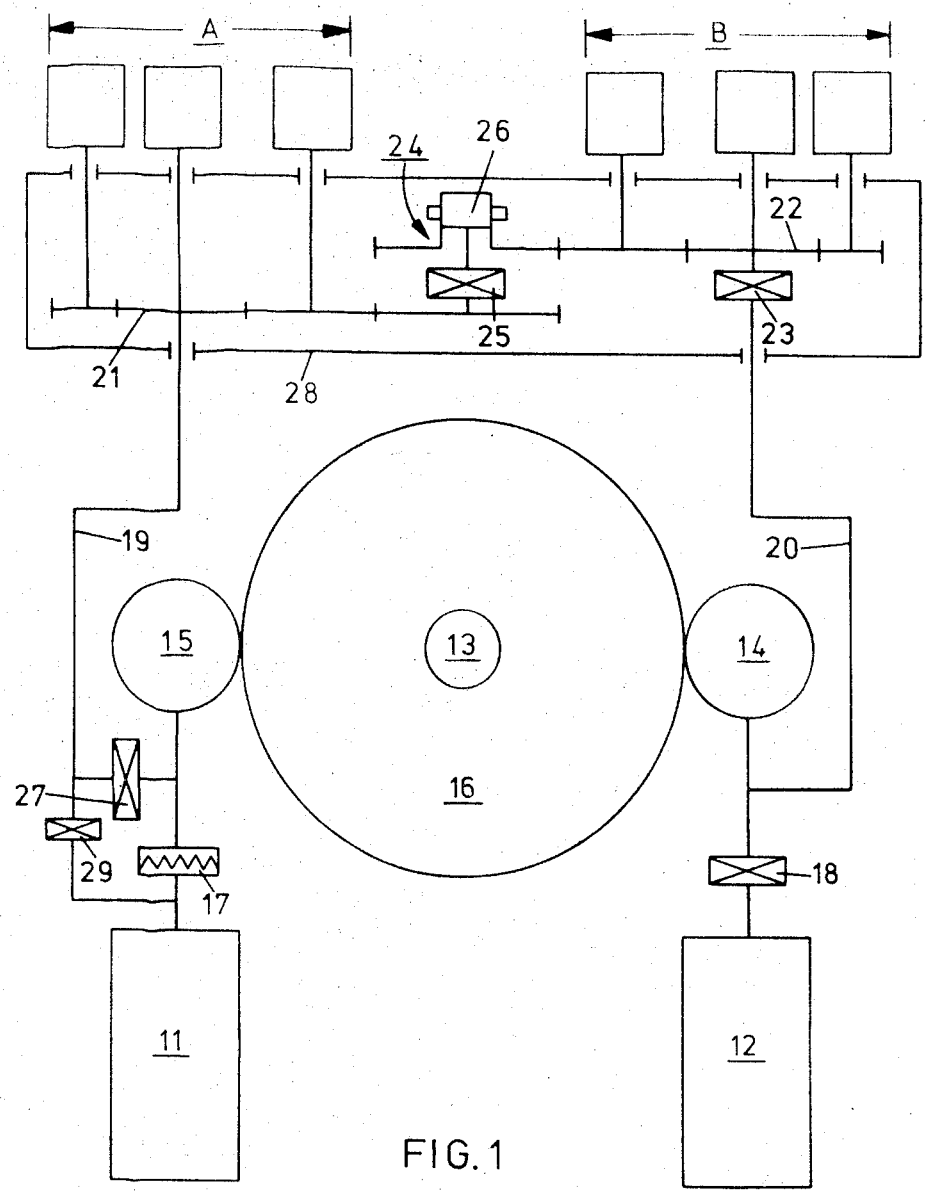
FIG. 1 is a diagrammatic layout of a helicopter transmission system.

Referring now to FIG. 1, a helicopter has first and second engines, 11 and 12 respectively, arranged to drive a rotor drive shaft 13 through gearing 14, 15 and 16. Freewheels 17 and 18 are incorporated in the drives, the freewheel 17 being connected to manual lockout means (not shown) for a purpose to be hereinafter explained. Through-shafts 19 and 20 are arranged to drive two gear trains 21 and 22, which operate a first set of accessories A and a second set of accessories B respectively. The gear train 22 of accessory B is arranged to rotate at a faster speed than the gear train 21 of accessory set A, when they are being driven by through-shafts 19 and 20 respectively.

A freewheel 23 is fitted in the through-shaft 20, and a freewheel 29 is fitted in the through-shaft 19. The gear trains 21 and 22 are connected through a double idler gear 24 incorporating a freewheel 25 and an overload protection device 26 such as a shear pin.

A freewheel 27 is fitted in an interconnection gearing in the drive arrangement from the first engine 11.

Figure 2:
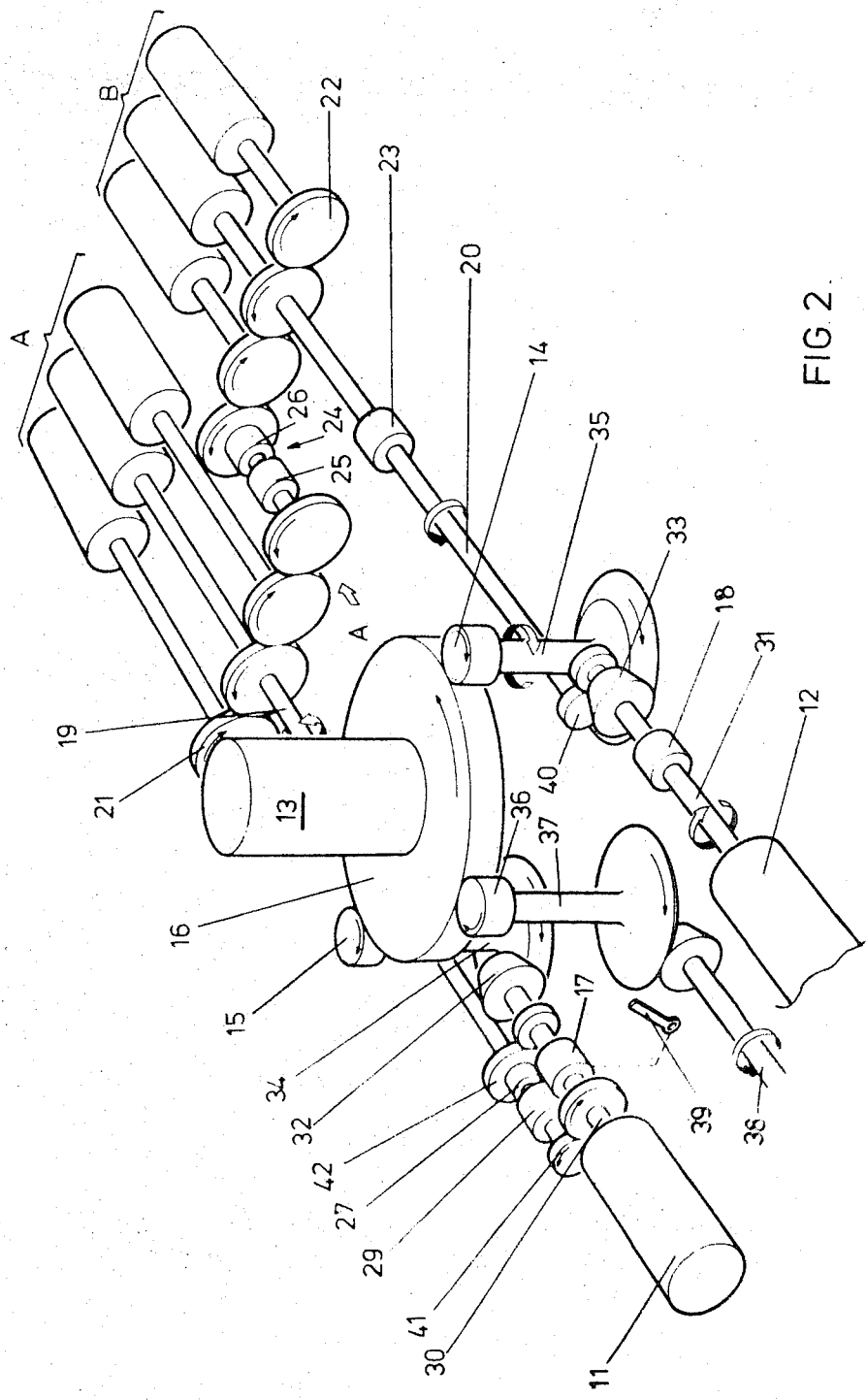
FIG. 2 is a perspective view showing a transmission system according to the invention embodied in a twin engine helicopter.

In FIG. 2 the same reference numerals are used to designate similar parts, and the following description is restricted to detail parts of the transmission system to show one way in which the system of FIG. 1 can be put into operation. The system shown is designed for installation above a helicopter cabin roof structure, the forward end of the cabin being in the direction of arrow A. The direction of rotation of the various parts of the system is indicated by the arrows in FIG. 2.

Drive shafts 30 and 31 are connected between the first and second engines 11 and 12 respectively, and spiral bevel gears 32 and 33 located at the lower end of two substantially vertical drive shafts at and 35. The gears 14 and 15 are carried a the upper end of the shafts 34 and 35 to mesh at each side of the gear 16 to produce a balanced arrangement which eliminates damaging side loads. Rotation of the gear 16 drives the rotor drive shaft 13 which can conveniently be of hollow construction to provide a passage for the helicopter rotor controls.

A third gear 36 meshes with the gear 16 and is located at the upper end of a drive shaft 37, and a bevel gear at the lower end of the shaft 37 transmits rotation to a tail rotor drive shaft 38.

Freewheels 17 and 18 are located in the drive shafts 30 and 31 respectively, freewheel 17 being connected to a manual control 39.

Through-shaft 20 is rotated by gearing 40 to drive gear train 22 of accessory set B through the freewheel 23. Through-shaft 19 is rotated by gearing 41 to drive gear train 21 of accessory set A through the freewheel 29, the gearing 41 being located on the engine side of the freewheel 17. The freewheels 17 and 29 are situated on their respective shafts 30 and 19, between the gearing 41 and an interconnection gearing 42. The interconnection gearing 42 comprises meshing gears located on shafts 19 and 30, the gear on the shaft 19 incorporating the freewheel 27.

The double idler gear 24 which connects the gear trains 21 and 22 is clearly shown in FIG. 2, together with the freewheel 25 and the overload protection device 26. The overload protection device 26 is shown located on the inner surface of one of the gears of the double idler gear 24; however, in practice it may be more convenient to mount the device 26 on the other side of the gear to protrude through a gearbox casing (not shown) to facilitate regular inspection procedures. As described in connection with FIG. 1, the gearing is so arranged that the gear train 22 of accessory set B rotates at a faster speed than the gear train 21 of accessory set A, when the gear trains are being driven by the through-shafts 19 and 20 respectively.

It is to be understood that the number and arrangements of accessories in sets A and B are not limited to that shown in the drawing. For instance, each accessory set may include some or all of the following services:- hydraulic pump, lubricating oil pump, generator, and tachometer.

Operation of the transmission system of the present invention is as follows:

1. Ground running

When it is desired to operate the accessories without turning the rotor drive shaft 13, the freewheel 17 is locked out manually to isolate the bevel gear 32 and, therefore, the gear 15, when engine 11 is started. The engine 11 drives the through-shaft 19 by gearing 41 to operate the gear train 21 of accessory set A which also drives the gear train 22 of accessory set B through the freewheel 25 in the double idler gear 24. Through-shaft 20 is isolated by freewheel 23, and interconnection gearing 42 is isolated by the freewheel 27. Thus both sets of accessories A and B can be operated from engine 11 with the rotor drive shaft 13 stationary.

2. Normal operation

During normal twin engine operating conditions the freewheel 25 enables each set of accessories A and B to be independently driven, thus halving the power to be transmitted by the gear trains 21 and 22, and by freewheels 23 and 29. This is accomplished by the gear train 22 of accessory set B rotating at a faster speed than the gear train 21 of accessory set A so that, during twin engine operating, the freewheel 25 overrides at about 1 per cent slip. During normal operation the drive to through-shaft 19 is shared by gearing 41 and 42.

3. Failure conditions a. Failure of engine 11, freewheel 17, or gear train 21 of accessory set A The stoppage of gear train 21 will not affect gear train 22 of accessory set B, which will continue to operate by overriding at freewheel 25 in the double idler gear 24, the gear train 22 being driven by through-shaft 20 to maintain essential services. In the case of failure of engine 11 or freewheel 17, the rotor drive shaft will be driven by the engine 12 through the drive shaft 31, the bevel gearing 33, and the gearing 14 and 16.

b. Failure of engine 12, freewheel 18 or freewheel 23

In this case the direct power supply to gear train 22 is stopped; however, gear train 22 will continue to operate by being driven through the freewheel 25 in the double idler gear 24, so that both sets of accessories remain functional. In the case of a failure of engine 12 or freewheel 18, the rotor drive shaft will be driven by the engine 11 through the drive shaft 30, the bevel gearing 32 and the gearing 15 and 16.

c. Failure of freewheel 29

Failure of freewheel 29 will mean that the drive to the through-shaft 19 is taken over solely by the gearing 42, the system functioning as described for normal operation.

d. Failure of gear train 22 of accessory set B

Failure, for instance, jamming, of the gear train 22 of accessory set B will operate the overload protection device 26 to allow the gear train 21, and therefore the accessories in set A, to continue operation from the through-shaft 19.

e. Failure of both engines 11 and 12

Failure of both engines 11 and 12 will necessitate a landing by a procedure known in the art as autorotation, in which the pitch of the rotor blades is adjusted so that the blades are rotated by air flowing through the blades as the helicopter descends. Control is essential during this operation; therefore, it is vital that at least the essential accessories, for instance, the hydraulic pump, is operable during this condition of flight.

i. Systems without freewheel 27 and interconnection gearing

Rotation of the rotor drive shaft by the rotor blades during autorotation is transmitted through gears 16, 14, 33 and 40, to through-shaft 20 which drives the gear train 22 of accessory set B. Freewheels 17, 18 and 29 are overridden to isolate the engines 11 and 12, and freewheel 25 overrides, which isolates the gear train 21 of accessory set A.

ii. Systems with freewheel 27

Incorporation of freewheel 27 ensures that as well as accessory set B being operative as described above, the gear train 21 of accessory set A is driven via gearing 16, 15, 32 and 42 and through-shaft 19, thus providing a full set of functional accessories during the autorotation condition. Freewheels 17, 18 and 29 are overridden to isolate the engines 11 and 12. Failure of freewheel 27 under complete engine failure conditions means that the system will operate as described in (i) above.

The gear trains 21 and 22 and the double idler gear 24 can be located in a separate gearbox as designated by the outline 28 in FIG. 1, or alternatively may be incorporated in a main gearbox together with the gearing 14, 15 and 16 and freewheels 17, 18, 27 and 29.

From the foregoing it will be apparent that the present invention provides important advantages in power transmission systems for helicopters by ensuring that essential services are maintained through a wide range of failure conditions in both the power supply and transmission system, thus considerably enhancing the safety factor of the machine.

Although one embodiment only has been described and illustrated, it is to be understood that modifications can be made within the scope of the appended claims. For instance, the freewheels 17, 27 and 29, together with the associated drive shafts, could conveniently be arranged concentrically to provide a much more compact drive system than the parallel arrangement shown in FIG. 2.

I claim as my invention:

1. A power transmission system for a twin engined helicopter comprising, in combination, first drive means for connecting the first engine to a rotor drive shaft, second drive means for connecting the first engine to a first gear train adapted to drive a first set of accessories, third drive means for connecting the second engine to the rotor drive shaft, fourth drive means for connecting the third drive means to a second gear train adapted to drive a second set of accessories, freewheel units located one in each of the four drive means, a manual lockout means connected to the free-wheel unit in the first drive means, a double idler gear interconnecting the first and second gear trains in staggered relationship, and a free-wheel unit and an overload protection device in the double idler gear.

2. A power transmission system as claimed in claim 1 further comprising a fifth drive means interconnecting the first and second drive means, and a free-wheel unit located in said fifth drive means.

3. A power transmission system as claimed in claim 1 wherein the first and second gear trains and the double idler gear are housed in a gearbox separate from the remainder of the transmission system.

4. A power transmission system as claimed in claim 1, wherein the first and second gear trains rotate at different speeds so that during twin engine operation overriding of the free-wheel unit in the double idler gear ensures that the first and second gear trains are driven independently by the first and second engines, respectively.

5. A power transmission system as claimed in claim 1, wherein said double idler gear comprises two idler gears meshing with said first and second gear trains, respectively, and coupled together through said free-wheel unit in said idler gear and said overload protection device.

* * * * *